US008565185B2

(12) United States Patent
Oba

(10) Patent No.: US 8,565,185 B2
(45) Date of Patent: Oct. 22, 2013

(54) FRAMEWORK OF MEDIA-INDEPENDENT PRE-AUTHENTICATION SUPPORT FOR PANA

(75) Inventor: Yoshihiro Oba, Englewood Cliffs, NJ (US)

(73) Assignees: Toshiba America Research, Inc., Piscataway, NJ (US); Telcordia Technologies, Inc., Piscataway, NJ (US); Kabushiki Kaisha Toshiba, Kawasaki (JP)

( * ) Notice: Subject to any disclaimer, the term of this patent is extended or adjusted under 35 U.S.C. 154(b) by 774 days.

(21) Appl. No.: 11/308,175

(22) Filed: Mar. 9, 2006

(65) Prior Publication Data

US 2007/0008926 A1    Jan. 11, 2007

Related U.S. Application Data

(60) Provisional application No. 60/595,169, filed on Jun. 13, 2005.

(51) Int. Cl.
| | |
|---|---|
| *H04W 4/00* | (2009.01) |
| *H04L 9/00* | (2006.01) |
| *H04L 9/32* | (2006.01) |
| *H04W 36/22* | (2009.01) |
| *H04W 36/00* | (2009.01) |
| *H04J 3/22* | (2006.01) |

(52) U.S. Cl.
USPC ........ 370/331; 455/436; 455/432.1; 713/168; 370/338; 370/466; 370/328

(58) Field of Classification Search
USPC .......................................... 370/331; 455/436
See application file for complete search history.

(56) References Cited

U.S. PATENT DOCUMENTS

| 6,879,830 B1 | 4/2005 | Vollmer et al. | |
|---|---|---|---|
| 7,421,268 B2 * | 9/2008 | Lee et al. | 455/411 |
| 2004/0022212 A1 * | 2/2004 | Chowdhury et al. | 370/329 |
| 2004/0078571 A1 * | 4/2004 | Haverinen | 713/168 |
| 2004/0242228 A1 * | 12/2004 | Lee et al. | 455/432.1 |
| 2006/0056448 A1 * | 3/2006 | Zaki et al. | 370/466 |
| 2006/0179307 A1 * | 8/2006 | Stieglitz et al. | 713/168 |

FOREIGN PATENT DOCUMENTS

WO          0158182 A2     8/2001

OTHER PUBLICATIONS

D. Forsberg, et al. "Protocol for carrying authentication for network access (PANA) draft-ietf-pana-pana-07.txt", Internet Engineering task force, Dec. 29, 2004.*
A. Dutta et al., "A Framework of Media-Independent Pre-Authentication (MPA) draft-ohba-mobopts-mpa-framework-00.txt," Internet Engineering Task Force, Feb. 13, 2005.

(Continued)

*Primary Examiner* — Christopher M Brandt
*Assistant Examiner* — Muthuswamy Manoharan
(74) *Attorney, Agent, or Firm* — Westerman, Hattori, Daniels & Adrian, LLP

(57) ABSTRACT

According to some of the preferred embodiments, a method for proactively establishing a security association between a mobile node in a visiting network and an authentication agent in another network to which the mobile node can move includes: negotiating pre-authentication using a flag in a message header that indicates whether the communication is for establishing a pre-authentication security association; and one of the mobile node and the authentication agent initiating pre-authentication by transmitting a message with the flag set in its message header, and the other of the mobile node and the authentication agent responding with the flag set in its message header only if it supports the pre-authentication.

18 Claims, 3 Drawing Sheets

(56) References Cited

OTHER PUBLICATIONS

Y. Ohba (Toshiba), "Pre-Authentication support for PANA; draft-ietf-pana-preauth-00.txt," Internet Engineering Task Force, Oct. 12, 2005.

Hyun-Ho Choi, et al., "A Seamless Handoff Scheme for UMTS-WLAN Interworking," IEEE Communications Socieety, Globecom 2004, vol. 3, Nov. 29, 2004, pp. 1559-1564.

D. Forsberg, et al., "Protocol for Carrying Authentication for Network Access (PANA); draft-ietf-pana-pana-07.txt," Internet Engineering Task Force, Dec. 29, 2004.

International Search Reported dated Oct. 6, 2006.

P. Jayaraman, PANA Framework, Jul. 11, 2005, p. 1-30, Internet Draft, USA.

A. Dutta, Media-Independent Pre-Authentication Implementation Results, Jul. 2005, p. 1-16, Internet Draft, USA.

S. Bradner, Key Words for Use in RFC's to Indicate Requirement Levels, Mar. 1997, p. 1-3, USA.

D. Forsberg, PANA Mobility Optimizations, Jan. 17, 2005, p. 1-13, Internet Draft, USA.

J. Bournelle, Use of Context Transfer Protocol for PANA, Jun. 24, 2005, p. 1-19, Internet Draft, USA.

J. Loughney, Context Transfer Protocol, Aug. 2004, p. 1-33, Internet Draft, USA.

Canadian Office Action dated Feb. 19, 2013, issued in corresponding Canadian Patent Application No. 2,611,943 (2 pages).

\* cited by examiner

FRAMEWORK OF MEDIA-INDEPENDENT PRE-AUTHENTICATION SUPPORT FOR PANA

The present application claims priority under 35 U.S.C. 119 to U.S. Provisional Application Ser. No. 60/595,169 filed on Jun. 13, 2005, the entire contents of which are incorporated herein by reference. In addition, the present application incorporates by reference the entire disclosures of each of the following U.S. Provisional Patent Applications: 1) Ser. No. 60/625,106, filed on Nov. 5, 2004, entitled Network Discovery Mechanism For Secure Fast Handoff; 2) Ser. No. 60/593,377, filed on Jan. 9, 2005, entitled Network Discovery Mechanisms; 3) Ser. No. 60/670,655, filed on Apr. 13, 2005, entitled Network Discovery Mechanisms; and 4) Ser. No. 60/697,589, filed on Jul. 11, 2005, entitled RDF Schema Update for 802.1 Baseline Document; and 5) U.S. Provisional Patent Application No. 60/649,554 filed Feb. 4, 2005, entitled A Framework Of Media-Independent Pre-Authentication. In addition, the entire disclosure of the following co-pending Utility U.S. patent application is incorporated herein by reference: U.S. patent application Ser. No. 10/761,243 entitled Mobility Architecture Using Pre-Authentication, Pre-Configuration and/or Virtual Soft-Handoff, filed on Jan. 22, 2004.

BACKGROUND

1. Field of the Invention

The present application relates to, inter alia, methods for pre-authentication, including, e.g., pre-authentication supporting PANA and the like.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

FIG. 4 depicts some illustrative architectural components that can be employed in some illustrative and non-limiting implementations including wireless access points to which client devices communicate. In this regard, FIG. 4 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22.

PANA:

For reference, information related to PANA from P. Jayaraman, "PANA Framework," Internet-Draft, draft-ietf-pana-framework-01.txt, work in progress, July 2004 is incorporated herein in this section. In this regard, PANA is a link-layer agnostic network access authentication protocol that runs between a node that wants to gain access to the network and a server on the network side. PANA defines a new EAP [see B. Aboba, et al, "Extensible Authentication Protocol (EAP)," RFC 3748, June 2004] lower layer that uses IP between the protocol end points. Id.

The motivation to define such a protocol and the requirements are described in Yegin, A. and Y. Ohba, *Protocol for Carrying Authentication for Network Access (PANA) Requirements*, draft-ietf-pana-requirements-08 (work in progress), June 2004. Protocol details are documented in Forsberg, D., Ohba, Y., Patil, B., Tschofenig, H. and A. Yegin, *Protocol for Carrying Authentication for Network Access (PANA)*, draft-ietf-pana-pana-04 (work in progress), May 2004. Parthasarathy, M., *PANA Enabling IPsec Based Access Control*, draft-ietf-pana-ipsec-03 (work in progress), May 2004. describes the use of IPsec for access control following PANA-based authentication. IPsec can be used for per-packet access control, but nevertheless it is not the only way to achieve this functionality. Alternatives include reliance on physical security and link-layer ciphering. Separation of PANA server from the entity enforcing the access control has been envisaged as an optional deployment choice. SNMP [see Mghazli, Y., Ohba, Y. and J. Bournelle, *SNMP Usage for PAA-2-EP Interface*, draft-ietf-pana-snmp-00 (work in progress), April 2004 has been chosen as the protocol to carry associated information between the separate nodes. Id.

PANA design provides support for various types of deployments. Access networks can differ based on the availability of lower-layer security, placement of PANA entities, choice of client IP configuration and authentication methods, etc. Id.

PANA can be used in any access network regardless of the underlying security. For example, the network might be physically secured, or secured by means of cryptographic mechanisms after the successful client-network authentication. Id.

The PANA client, PANA authentication agent, authentication server, and enforcement point have been functional entities in this design. PANA authentication agent and enforcement point(s) can be placed on various elements in the access network (such as, e.g., access point, access router, dedicated host). Id.

IP address configuration mechanisms vary as well. Static configuration, DHCP, stateless address autoconfiguration are possible mechanisms to choose from. If the client configures an IPsec tunnel for enabling per-packet security, configuring IP addresses inside the tunnel becomes relevant, for which there are additional choices such as IKE. Id.

PANA protocol is designed to facilitate authentication and authorization of clients in access networks. PANA is an EAP [see Aboba, B., Blunk, L., Vollbrecht, J., Carlson, J. and H. Levkowetz, *Extensible Authentication Protocol (EAP)*, RFC 3748, June 2004, lower-layer that carries EAP authentication methods encapsulated inside EAP between a client host and an agent in the access network. While PANA enables the authentication process between the two entities, it is only a part of an overall AAA and access control framework. An AAA and access control framework using PANA includes four functional entities, as discussed below and as schematically depicted in FIGS. 1(A) to 1(C). Id.

A first functional entity is a PANA Client (PaC) is the client implementation of the PANA protocol. This entity resides on the end host that is requesting network access. The end hosts can include, for example, laptops, PDAs, cell phones, desktop PCs and/or the like that are connected to a network via a wired or wireless interface. A PaC is responsible for requesting network access and engaging in the authentication process using the PANA protocol. Id.

A second functional entity is a PANA Authentication Agent (PAA) is the server implementation of the PANA protocol. A PAA is in charge of interfacing with the PaCs for authenticating and authorizing them for the network access service. The PAA consults an authentication server in order to verify the credentials and rights of a PaC. If the authentication server resides on the same host as the PAA, an application program interface (API) is sufficient for this interaction. When they are separated (a more common case in public access networks), a protocol is used to run between the two. LDAP [see Hodges, J. and R. Morgan, *Lightweight Directory Access Protocol (v3): Technical Specification*, RFC 3377, September 2002] and AAA protocols like RADIUS [see Rigney, C., Willens, S., Rubens, A. and W. Simpson, *Remote Authentication Dial In User Service (RADIUS)*, RFC 2865, June 2000] and Diameter [see Calhoun, P., Loughney, J., Guttman, E., Zorn, G. and J. Arkko, *Diameter Base Protocol*, RFC 3588, September 2003] are commonly used for this purpose. Id.

The PAA is also responsible for updating the access control state (i.e., filters) depending on the creation and deletion of the authorization state. The PAA communicates the updated state to the enforcement points in the network. If the PAA and EP are residing on the same host, an API is sufficient for this communication. Otherwise, a protocol is used to carry the authorized client attributes from the PAA to the EP. While not prohibiting other protocols, currently SNMP [see Mghazli, Y., Ohba, Y. and J. Bournelle, *SNMP Usage for PAA-2-EP Interface*, draft-ietf-pana-snmp-00 (work in progress), April 2004, has been suggested for this task. Id.

The PAA resides on a node that is typically called a Network Access Server (NAS) in the local area network. The PAA can be hosted on any IP-enabled node on the same IP subnet as the PaC. For example, on a BAS (broadband access server) in DSL networks, or PDSN in 3GPP2 networks. Id.

A third functional entity is an Authentication Server (AS), which is the server implementation that is in charge of verifying the credentials of a PaC that is requesting the network access service. The AS receives requests from the PAA on behalf of the PaCs, and responds with the result of verification together with the authorization parameters (e.g., allowed bandwidth, IP configuration, etc). The AS might be hosted on the same host as the PAA, on a dedicated host on the access network, or on a central server somewhere on the Internet. Id.

A fourth functional entity is an Enforcement Point (EP), which is the access control implementation that is in charge of allowing access to authorized clients while preventing access by others. An EP learns the attributes of the authorized clients from the PAA. The EP uses non-cryptographic or cryptographic filters to selectively allow and discard data packets. These filters may be applied at the link-layer or the IP-layer. When cryptographic access control is used, a secure association protocol needs to run between the PaC and EP. Link or network layer protection (for example, TKIP, IPsec ESP) is used after the secure association protocol established the necessary security association to enable integrity protection, data origin authentication, replay protection and optionally confidentiality protection. An EP should be located strategically in a local area network to minimize the access of unauthorized clients to the network. For example, the EP can be hosted on a switch that is directly connected to clients in a wired network. That way, the EP can drop unauthorized packets before they reach any other client host or beyond the local area network. Id.

Some of the entities may be co-located depending on the deployment scenario. For example, the PAA and EP could be on the same node (BAS) in DSL networks. In that case, a simple API is sufficient between the PAA and EP. In small enterprise deployments, the PAA and AS may be hosted on the same node (e.g., access router) that eliminates the need for a protocol run between the two. The decision to co-locate these entities or otherwise, and their precise location in the network topology are deployment decisions. Id.

Use of IKE or 4-way handshake protocols for secure association has been only required in the absence of any lower-layer security prior to running PANA. Physically secured networks (such as, e.g., DSL) or networks that are already cryptographically secured on the link-layer prior to PANA run (e.g., cdma2000) do not require additional secure association and per-packet ciphering. These networks can bind the PANA authentication and authorization to the lower-layer secure channel that is already available. Id.

The EP on the access network allows general data traffic from any authorized PaC, whereas it allows only limited type of traffic (e.g., PANA, DHCP, router discovery) for the unauthorized PaCs. This ensures that the newly attached clients have the minimum access service to engage in PANA and get authorized for the unlimited service. Id.

The PaC needs to configure an IP address prior to running PANA. After a successful PANA authentication, depending on the deployment scenario, the PaC may need to re-configure its IP address or configure additional IP address(es). The additional address configuration may be executed as part of the secure association protocol run. Id.

An initially unauthorized PaC starts the PANA authentication by discovering the PAA on the access network, followed by the EAP exchange over PANA. The PAA interacts with the AS during this process. Upon receiving the authentication and authorization result from the AS, the PAA informs the PaC about the result of its network access request. Id.

If the PaC is authorized to gain the access to the network, the PAA also sends the PaC-specific attributes (e.g., IP address, cryptographic keys, etc.) to the EP by using SNMP. The EP uses this information to alter its filters for allowing data traffic from and to the PaC to pass through. Id.

In case cryptographic access control needs to be enabled after the PANA authentication, a secure association protocol runs between the PaC and the EP. The PaC should already have the input parameters to this process as a result of the successful PANA exchange. Similarly, the EP should have obtained them from the PAA via SNMP. Secure association exchange produces the required security associations between the PaC and the EP to enable cryptographic data traffic protection. Per-packet cryptographic data traffic protection introduces additional per-packet overhead but the overhead exists only between the PaC and EP and will not affect communications beyond the EP. In this sense, it is important to place the EP as close to the edge of the network as possible. Id.

Finally data traffic can start flowing from and to the newly authorized PaC. Id.

MPA Framework:

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters from a candidate target network, but also able to send and receive IP packets using the obtained IP address and other configuration parameters, before it attaches to the candidate target network when the candidate target network becomes the target network. This makes it possible for the mobile node to complete the binding update of any mobility management protocol and use the new care-of address before performing a handover at link-layer.

This functionality is provided by allowing a mobile node, which has a connectivity to the current network but is not yet attached to a candidate target network, to (i) establish a security association with the candidate target network to secure the subsequent protocol executions, then (ii) securely execute a configuration protocol to obtain an IP address and other configuration parameters from the candidate target network as well as a tunnel management protocol to establish a bidirectional tunnel between the mobile node and an access router of the candidate target network, then (iii) send and receive IP packets, including signaling messages for binding update of a mobility management protocol and data packets transmitted after completion of binding update, over the tunnel using the obtained IP address as the tunnel inner address, and finally (iv) deleting or disabling the tunnel immediately before attaching to the candidate target network when it becomes the target network and then re-assigning the inner address of the deleted or disabled tunnel to its physical interface immediately after the mobile node is attached to the target network through the interface. Instead of deleting or disabling the tunnel before attaching to the the target network, the tunnel may be deleted or disabled immediately after attached to the target network.

Especially, the third procedure makes it possible for the mobile to complete higher-layer handover before starting link-layer handover. This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover." The security association established through pre-authentication is referred to as an "MPA-SA." The tunnel established through pre-configuration is referred to as a "proactive handover tunnel."

In the MPA framework, the following functional elements are expected to reside in each candidate target network to communicate with a mobile node: Authentication Agent (AA), Configuration Agent (CA) and Access Router (AR). Some or all of those elements can be placed in a single network device or in separate network devices.

An authentication agent is responsible for pre-authentication. An authentication protocol is executed between the mobile node and the authentication agent to establish an MPA-SA. The authentication protocol must be able to derive a key between the mobile node and the authentication agent, SHOULD be able to provide mutual authentication. The authentication protocol SHOULD be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers MAY also be derived from the MPA-SA.

A configuration agent is responsible for one part of pre-configuration, namely securely executing a configuration protocol to securely deliver an IP address and other configuration parameters to the mobile node. The signaling messages of the configuration protocol must be protected using a key derived from the key corresponding to the MPA-SA.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol must be protected using a key derived from the key corresponding to the MPA-SA. IP packets transmitted over the proactive handover tunnel SHOULD be protected using a key derived from the key corresponding to the MPA-SA.

In some of the preferred embodiments described herein, systems and methods are described to proactively establish higher layer and lower layer contexts of different media. Here, media includes, e.g., the available networks accessible to mobile devices (e.g., wired, wireless licensed, wireless unlicensed, etc.). See, e.g., media discussed in I.E.E.E. 802, including I.E.E.E. 802.21. Media may include, e.g., wireless LAN (e.g., I.E.E.E. 802.11), I.E.E.E. 802.16, I.E.E.E. 802.20, Bluetooth, etc. Some illustrative examples include: 1) a mobile device switching from a cellular network to a wireless or WIFI network, such as, e.g., a cell phone with cellular interface and wireless interface trying to get WIFI access by obtaining information (e.g., keys, etc.) initially over the cellular network, rather than simultaneously establishing a wireless interface; 2) where a mobile device currently has wireless or WIFI connectivity, where the wireless LAN may potentially shut down quickly or the like, in which case, by way of example, the mobile device can proactively do pre-authentication via cellular network (i.e., so as to enable a quick switch if needed). In some illustrative cases, a mobile node with a single IEEE 802.xx interface may roam among multiple subnets and multiple administrative domains. While keeping multiple interfaces always-on is an option, a mobile node may want to deactivate unused interfaces in some instances (such as, e.g., to save power, etc.). In addition, MPA can provide, among other things, secure and seamless mobility optimization that works for inter-subnet handoff, inter-domain handoff, inter-technology handoff, etc., as well as the use of multiple interfaces.

BACKGROUND REFERENCES

The present invention provides a variety of advances and improvements over, among other things, the systems and methods described in the following references, the entire disclosures of which references are incorporated herein by reference.
1. [I-D.ietf-pana-pana] Forsberg, D., Ohba, Y., Patil, B., Tschofenig, H. and A. Yegin, "Protocol for Carrying Authentication for Network Access (PANA)", draft-ietf-pana-pana-08 (work in progress), May 2005.
2. [I-D.ohba-mobopts-mpa-framework] A. Dutta, Y. Ohba, K. Taniuchi and H. Schulzrinne, "A Framework of Media-independent Pre-Authentication (MPA)", draft-ohba-mobopts-mpa-framework-00 (work in progress), February 2005.
3. [RFC2119] Bradner, S., "Key words for use in RFCs to Indicate Requirement Levels", BCP 14, *RFC* 2119, March 1997.
4. [I-D.ietf-pana-mobopts] Forsberg, D., "PANA Mobility Optimizations", *draft-ietf-pana-mobopts*-00 (work in progress), January 2005.
5. [I-D.bournelle-pana-ctp] Bournelle, J., "Use of Context Transfer Protocol (CxTP) for PANA", *draft-bournelle-pana-ctp*-03 (work in progress), June 2005.
6. [I-D.ietf-seamoby-ctp] Loughney, J., "Context Transfer Protocol", *draft-ietf-seamoby-ctp*-11 (work in progress), August 2004.

SUMMARY OF THE INVENTION

The present invention improves upon the above and/or other background technologies and/or problems therein.

According to some of the preferred embodiments, a method for proactively establishing a security association between a mobile node in a visiting network and an authentication agent in another network to which the mobile node can move includes: negotiating pre-authentication using a flag in a message header that indicates whether the communication is for establishing a pre-authentication security association; and one of the mobile node and the authentication agent initiating pre-authentication by transmitting a message with the flag set in its message header, and the other of the mobile node and the authentication agent responding with the flag set in its message header only if it supports the pre-authentication. In some examples, the method further includes performing the pre-authentication using a link-layer agnostic network access authentication protocol between the mobile node and the authentication agent at a server on the another network. In some other examples, the method further includes performing the pre-authentication across multiple administrative domains. In some other examples, the method further includes performing the pre-authentication in the framework of media-independent pre-authentication. In some other examples, the method further includes that the visiting network is for a first media and the another network is for a different media, wherein either the first-media is cellular and the different-media is wireless LAN or the first-media is wireless LAN and the different-media is cellular. In some other examples, the method further includes having the other of the mobile node and the authentication agent respond with an error message if it does not support the pre-authentication.

In some other examples, the method further includes employing PANA as the network access authentication protocol. In preferred embodiments, the method includes having the flag include a P-flag in the PANA header. In some examples, the method involves having the mobile node transmit a PANA-PAA-Discover message with a P-flag set to initiate pre-authentication or having the authentication agent transmit a PANA-Start-Request message with a P-flag set to initiate pre-authentication.

According to some embodiments, a mobile node configured to proactively establishing a security association from a visiting network with an authentication agent in another network to which the mobile node can move includes: the mobile node being configured to negotiate pre-authentication using a flag in a message header that indicates whether the communication is for establishing a pre-authentication security association; and the mobile node being configured such that one of the mobile node and the authentication agent initiate pre-authentication by transmitting a message with the flag set in its message header, and the other of the mobile node and the authentication agent responds with the flag set in its message header only if it supports the pre-authentication.

According to some embodiments, an authentication agent configured to proactively establishing a security association with a mobile node from a visiting network while the authentication agent is in another network to which the mobile node can move includes: the authentication agent node being configured to negotiate pre-authentication using a flag in a message header that indicates whether the communication is for establishing a pre-authentication security association; and the authentication agent being configured such that one of the mobile node and the authentication agent initiate pre-authentication by transmitting a message with the flag set in its message header, and the other of the mobile node and the authentication agent responds with the flag set in its message header only if it supports the pre-authentication.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DISCUSSION OF THE PREFERRED EMBODIMENTS

Figure 1:
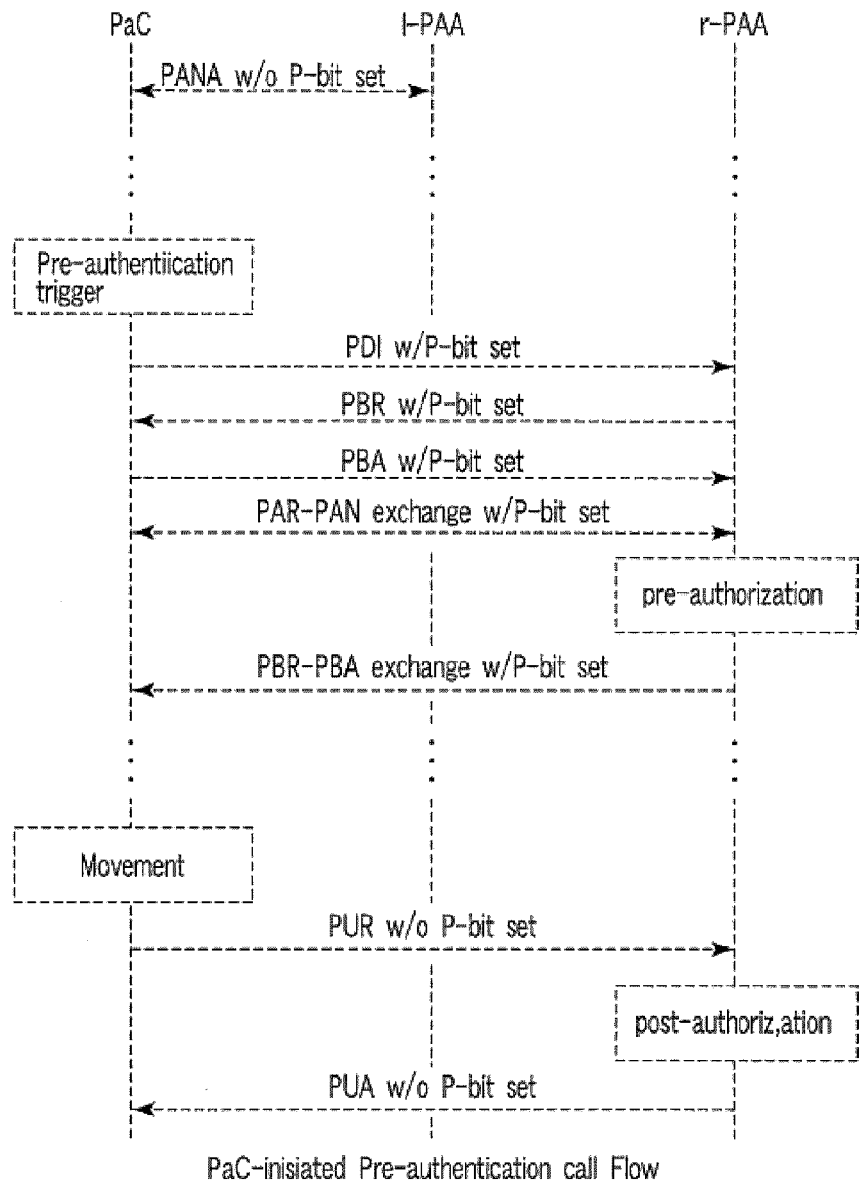
FIG. 1 is a diagram depicting a PaC initiated pre-authentication call flow according to some illustrative embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

In the following discussion, the following terminology is employed.

Access Network: A network through which a PaC can access to the Internet via one or more EPs controlled by one or more PAAs. An access network may consist of multiple IP links.

Local PAA: A PAA (PANA authentication agent) that resides in the visiting network where the PaC (PANA client) is connected. The term "local" is relative to the location of a particular PaC.

Remote PAA: A PAA which resides in a network other than the visiting network. That is, a PAA that is not a local PAA for the PaC. The term "remote" is relative to the location of a particular PaC. A PAA that is a remote PAA for one PaC may be a local PAA for another PaC.

Local PaC: A PaC that resides in the same access network as a particular PAA. The term "local" is relative to the location of a specific PaC.

Remote PaC: A PaC that is not a local PaC for a particular PAA. The term "remote" is relative to the location of a particular PAA. A PaC that is a remote PaC for one PAA may be a local PaC for another PAA.

Active PAA: A local PAA for which the PaC has a PANA session.

Preparing PAA: A remote PAA which performs pre-authentication with the PaC. A PAA that is serving as a preparing PAA for one PaC may be serving as an active PAA for another PaC.

Pre-authentication: In the PANA environment, by way of example, this can involve authentication performed between a PaC and a preparing PAA.

Pre-authentication SA: In the PANA environment, by way of example, a PANA SA (Security Association) that is established between the PaC and a preparing PAA as a result of successful pre-authentication.

Active SA: In the PANA environment, by way of example, a PANA SA that is established between the PaC and the active PAA.

Pre-authorization: In the PANA environment, by way of example, an authorization that is made for the PaC by a preparing PAA as a result of successful pre-authentication.

Post-authorization: In the PANA environment, by way of example, an authorization that was made for the PaC by a PAA that was acting as a preparing PAA and has become the active PAA.

1. The Preferred Embodiments

The preferred embodiments, among other things, define an extension to the PANA protocol [I-D.ietf-pana-pana] used for proactively establishing a PANA SA (Security Association) between a PaC in the visiting network and a PAA in another network to which the PaC may move. In the preferred embodiments, the mechanism operates across multiple administrative domains. In addition, the mechanism is preferably used as the authentication protocol in the framework of MPA (Media-independent Pre-authentication) [see I-D.ohba-mobopts-mpa-framework].

1. (Multiple PANA sessions). A PaC that supports pre-authentication may have one or more PANA session for preparing PAAs in addition to the PANA session for one of local PAAs.
2. (Initiation of pre-authentication). Pre-authentication may be initiated by both the PaC and the PAA.
3. (Negotiation of pre-authentication). A new flag P-flag is defined in the PANA header. When pre-authentication is performed, PANA messages contain a new flag to indicate whether this PANA run is for establishing a pre-authentication SA. In the preferred embodiments, the pre-authentication is negotiated in the PANA discovery and initial handshake phase as follows.

When the PaC initiates pre-authentication, it sends a PANA-PAA-Discover message with the P-flag set. The PAA responds with a PANA-Start-Request message with the P-flag set only when it supports pre-authentication. Otherwise, it sends a PANA-Error message with a new Result Code "PANA_HDR_BIT_UNSUPPORTED".

When the PAA initiates pre-authentication, it sends a PANA-Start-Request message with the P-flag set. The PaC responds with a PANA-Start-Answer message with the P-flag set only when it supports pre-authentication. Otherwise, it sends a PANA-Error message with a new Result Code "PANA_HDR_BIT_UNSUPPORTED".

Once the PaC and PAA have agreed on performing pre-authentication during discovery and handshake phase, the subsequent PANA messages exchanged between them must have the P-flag set.

4. (Switching from pre-authentication SA to active SA). When the preparing PAA becomes the active PAA due to movement of the PaC, the PaC performs an IP address update procedure using PANA-Update exchange in order to update the PAA of the PaC's new address obtained from the remote network where the PAA resides. The completion of the PANA-Update procedure will change the pre-authentication SA to the active SA. The p-flag is not set in the PANA-Update messages and subsequent PANA messages.
5. (Handover with changing active PAAs without changing preparing PAA). When the PaC that has an active SA with the active PAA and a pre-authentication SA with a preparing PAA changes its active PAA without changing the preparing PAA, the PaC performs an IP address update procedure using PANA-Update exchange in order to update the PAA of the PaC's new address obtained from the remote network where the new active PAA resides. The completion of the PANA-Update procedure will not change the pre-authentication SA to the active SA. The p-flag is set in the PANA-Update messages and subsequent PANA messages.

6. (Deletion of pre-authentication SA). The pre-authentication SA and corresponding PANA session between the PaC and the pre-authenticated PAA can be deleted by entering the termination phase of the PANA protocol and performing the required procedure for that phase.

7. (Discovering remote PAA). There are a variety of ways to discover a remote PAA, including the information service defined in IEEE 802.21, which can be implemented by those of ordinary skill in the art.

8. (Location of preparing PAA). A preparing PAA should be placed in the same way as PAAs that do not support pre-authentication. For example, it can be placed in each access link or somewhere beyond the access links towards the center of the network.

9. (Authorization). A pre-authorization and a post-authorization for the PaC may have different authorization policies. For example, the pre-authorization policy may not allow the PaC to sent or receive packets through the EP(s) under control of the preparing PAA, while both the pre-authorization and post-authorization policies may allow installing credentials to the EP(s), where the credentials are used for establishing a security association for per-packet cryptographic filtering.

2. Further Discussion

The PANA protocol [see I-D.ietf-pana-pana] carries EAP messages between a PaC (PANA Client) and a PAA (PANA Authentication Agent) in an access network. If the PaC is a mobile device and is capable of moving one access network to another while running its applications, it is desired for the PaC to perform a handover seamlessly without degrading the performance of the applications during the handover period. When the handover requires the PaC to establish a PANA session with the PAA in the new access network, the signaling to establish the PANA session should be completed as fast as possible.

There is an optimization method based on Context Transfer Protocol (CTP) [see I-D.ietf-seamoby-ctp] to reduce the signaling delay for establishing a PANA session with a new PAA upon a handover [see I-D.ietf-pana-mobopts][see I-D.bournelle-pana-ctp].

The CTP-based method has a number of issues, including the following deficiencies. First, it is not readily applicable to handovers across multiple administrative domains since having a security association between PAAs in different administrative domains is practically difficult. Second, even within a single administrative domain, the CTP-based method is difficult to work when the previous and new access networks have different authorization characteristics, such as, e.g., on use of NAP and ISP separate authentication. Third, the CTP-based method relies on deriving the PANA_MAC_Key used between the PaC and the PAA in the new access network from the AAA-Key used between the PaC and the PAA in the previous access network, which does not provide sufficient cryptographic separation between the PAAs.

To address the issues on the CTP-based method, the preferred embodiments provide an extension to the PANA protocol [see I-D.ietf-pana-pana] used for proactively executing EAP authentication and establishing a PANA SA between a PaC in an access network and a PAA in another access network to which the PaC may move. In the preferred embodiments, the method operates across multiple administrative domains. In addition, the method is preferably used as the authentication protocol in the framework of MPA (Media-independent Pre-authentication) [see I-D.ohba-mobopts-mpa-framework].

Although the present methods can cover cases that are also covered by the CTP-based method (i.e., homogeneous authorization characteristics in a single administrative domain), in some preferred embodiments, the present methods do not replace the CTP-based method. Instead, in some preferred embodiments, the present methods are employed in cases that are not covered by the CTP-based method—such that, for cases covered by the CTP-based method, the CTP-based method can be used.

Pre-Authentication Procedure:

As indicated above, a PaC that supports pre-authentication may have one or more PANA sessions for preparing PAAs in addition to the PANA session for one of local PAAs. As also expressed above, there may be a number of ways to discover a remote PAA, however, remote PAA discovery and remote PaC discovery is out of the scope of this proposal. In addition, there may be a number of criteria as to when and with which remote PAA pre-authentication is performed. Such criteria depends on circumstances and can be implementation specific.

Pre-authentication may be initiated by both a PaC and a preparing PAA. As discussed above, in the preferred embodiments, a new flag P-flag is defined in the PANA header. When pre-authentication is performed, the P-flag of PANA messages are set in order to indicate whether this PANA run is for establishing a pre-authentication SA. In the preferred embodiments, pre-authentication is negotiated in the PANA discovery and handshake phase as follows.

When a PaC initiates pre-authentication, it sends a PANA-PAA-Discover message with the P-flag set. The PANA-PAA-Discover message must be unicast. The PAA responds with a PANA-Start-Request message with the P-flag set only when it supports pre-authentication. Otherwise, it must silently discard the message.

When a preparing PAA initiates pre-authentication, it sends a PANA-Start-Request message with the P-flag set. The PaC responds with a PANA-Start-Answer message with the P-flag set only when it supports pre-authentication. Otherwise, it must silently discard the message.

Once the PaC and preparing PAA have agreed on performing pre-authentication during the discovery and handshake phase, the subsequent PANA messages exchanged between them must have the P-flag set.

When the preparing PAA becomes an active PAA due to movement of the PaC, the PaC performs an IP address update procedure using PANA-Update exchange in order to update the PAA with the PaC's new address obtained from the remote network where the PAA resides. The completion of the PANA-Update procedure will change the pre-authentication SA to the active SA. The P-flag is not set in the PANA-Update messages and subsequent PANA messages.

When the PaC having an active SA with an active PAA as well as a pre-authentication SA with a preparing PAA changes its active PAA but without changing the preparing PAA, the PaC performs an IP address update procedure using PANA-Update exchange in order to update the PAA of the PaC's new address obtained from the remote network where the new active PAA resides. The completion of the PANA-Update procedure will not change the pre-authentication SA to the active SA. The P-flag is set in the PANA-Update messages and subsequent PANA messages.

The pre-authentication SA and corresponding PANA session between the PaC and the pre-authenticated PAA can be deleted by entering the termination phase of the PANA protocol and performing the required procedure for that phase.

For reference, an illustrative and non-limiting example call flow for a PaC-initiated pre-authentication is shown in FIG. 1. In this regard, a PaC in an access network establishes a PANA session with a local PAA (I-PAA). At some point, it receives a trigger for pre-authenticating to a remote PAA (r-PAA) in another access network. Then, the PaC initiates a pre-authentication procedure by sending a PANA-PAA-Discover message with the P-bit set. PANA messages are exchanged between the PaC and r-PAA, with the P-bit set for all messages. On successful completion of the PANA exchanges for pre-authentication and pre-authorization, a pre-authentication SA will be established between the PaC and I-PAA. On the other hand, the active SA established between the PaC and I-PAA stays active. At some point after establishing the pre-authentication SA, the PaC moves to the access network of the R-PAA. Then, the PaC initiates a PANA-Update exchange to inform the PAA of the IP address change. In this PANA-Update exchange, the P-bit is unset. On successful completion of the PANA-Update exchange and post-authorization procedure, the pre-authentication SA becomes the active SA. The active SA between the PaC and I-PAA may stay active for a while to deal with the case in which the PaC immediately switches back to the previous access network.

Figure 2:
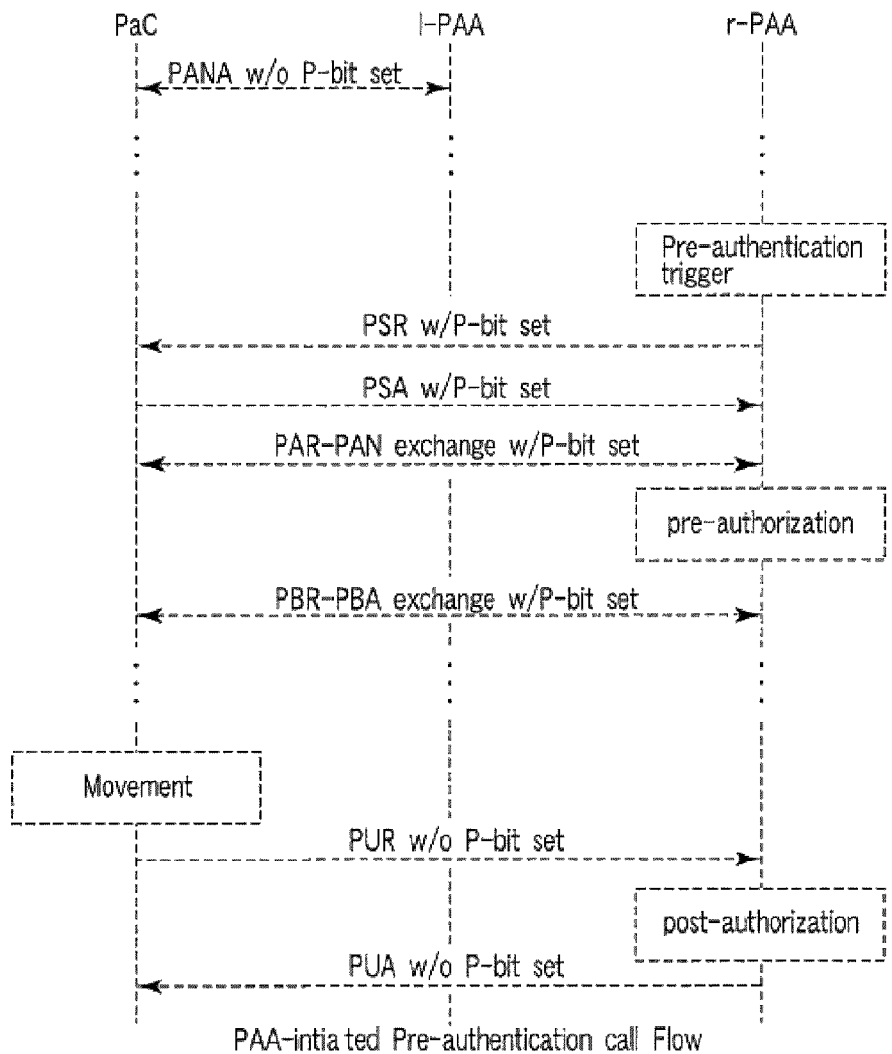
FIG. 2 is a diagram depicting a PAA initiated pre-authentication call flow according to some illustrative embodiments.

For reference, another example call flow for PAA-initiated pre-authentication is shown in FIG. 2. In this regard, a PaC in an access network establishes a PANA session with a local PAA (I-PAA). At some point, a remote PAA (r-PAA) in another access network receives a trigger for pre-authenticating to the PaC. Then, the PAA initiates a pre-authentication procedure, such as, e.g., transmitting a PANA-Start-Request message (PSR) with the P-flag set. The PaC then responds with a PANA-Start-Answer message (PSA) with the P-flag set only when it supports pre-authentication. Thereafter, as shown in FIG. 2, the call flow is parallel to that described above with reference to FIG. 1.

Figure 3:
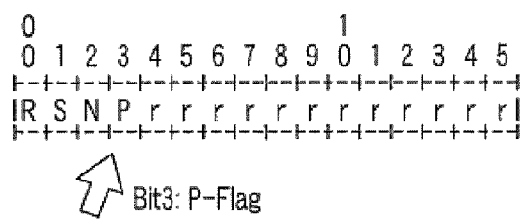
FIG. 3 is a diagram depicting illustrative P-Flag features according to some illustrative embodiments.
Figure 4:
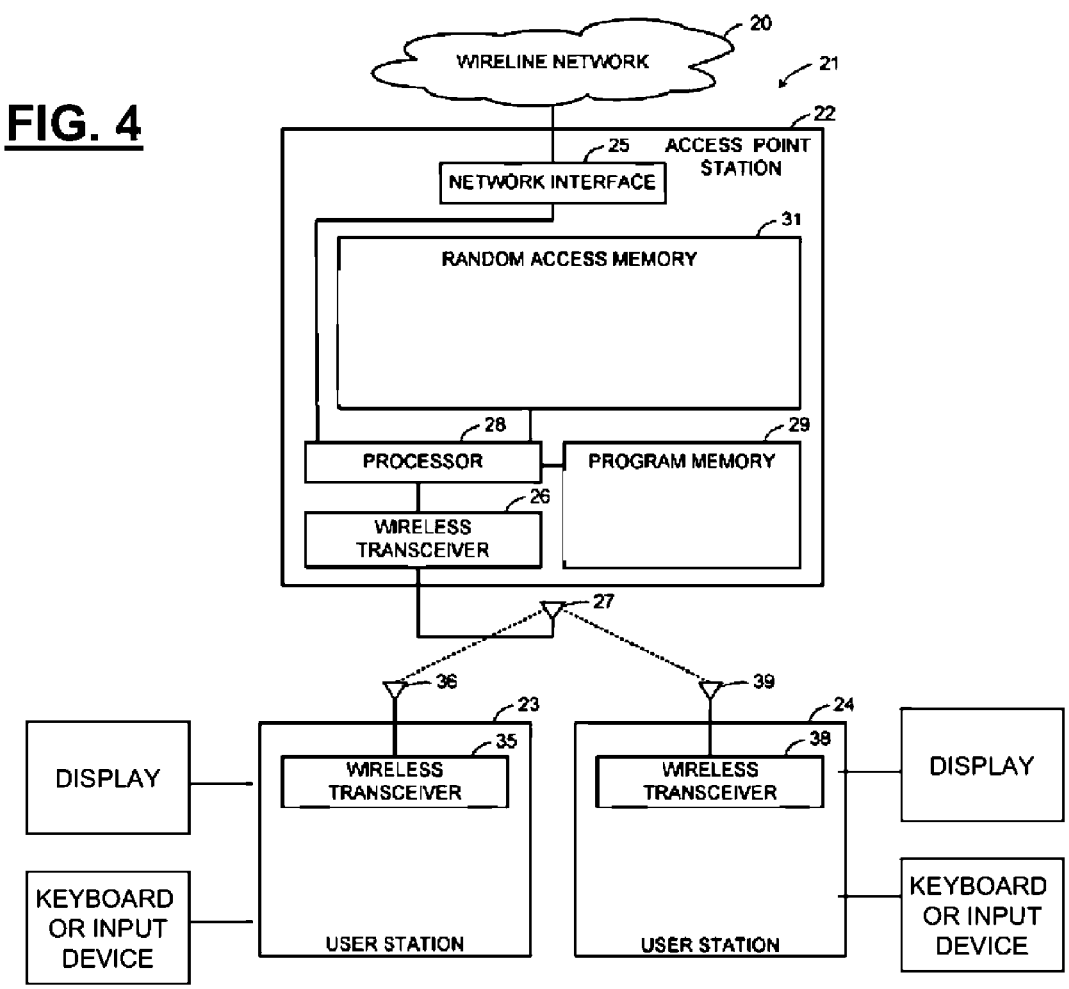
FIG. 4 is an architectural diagram showing exemplary sub-components of an illustrative access point and illustrative client devices or user stations according to some illustrative embodiments of the invention.

PANA Extensions:

As discussed above, in the preferred embodiments, a new P-flag is defined in Flags field of PANA header. In this regard, FIG. 3 shows an illustrative embodiment of the P-flag. In the preferred embodiments, when pre-authentication is performed, the P-flag of PANA messages are set in order to indicate whether this PANA run is for establishing a pre-authentication SA. A usage of this flag can be as described above. In the preferred implementations, this flag would be assigned by the Internet Assigned Numbers Authority (IANA). Thus, in the preferred embodiments, a new flag in the Flags field of PANA Header is to be assigned (e.g., by IANA), such as, e.g., in the illustrated example wherein the new flag is bit 3 (P-Flag), for "P"re-authentication.

Authorization and Accounting Considerations:

In some cases, a pre-authorization and a post-authorization for the PaC may have different authorization policies. For example, the pre-authorization policy may not allow the PaC to sent or receive packets through the enforcement points (EPs) under control of the preparing PAA, while both the pre-authorization and post-authorization policies may allow installing credentials to the EP(s), where the credentials are used for establishing a security association for per-packet cryptographic filtering. Depending on the pre-authorization policy, the PAA that has a pre-authentication SA for a PaC may start accounting immediately after the pre-authentication SA is established or may not start accounting until the pre-authentication SA becomes the active SA.

Security Considerations:

In the preferred embodiments, since the mechanism described in this document is designed to work across multiple access networks, each EP (Enforcement Point) should be configured to allow PANA messages to be forwarded between a PaC and a preparing PAA in a different access network only if the PaC has an active SA with a local PAA in order to avoid an unauthorized PaC to initiate pre-authentication. When pre-authentication is initiated by a remote PAA, it is possible that the PaC simultaneously communicates with multiple remote PAAs initiating pre-authentication. In the preferred embodiments, in order to avoid possible resource consumption attacks on the PaC caused by a blind attacker initiating pre-authentication for the PaC by changing source addresses, the PaC should limit the maximum number of PAAs allowed to communicate.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method for proactively establishing a security association between a mobile node in a visiting network and an authentication agent in another network to which the mobile node can move, comprising:

negotiating pre-authentication using a flag in a message header that indicates whether the communication is for establishing a pre-authentication security association; and said mobile node initiating pre-authentication by transmitting a message with the flag set in its message header, and said authentication agent responding with the flag set in its message header only if it supports the pre-authentication;

whereby establishing a pre-authentication security association before said mobile node moves from said visiting network to said another network;

further including performing said pre-authentication using a link-layer agnostic network access authentication protocol between said mobile node and said authentication agent at a server on the another network; and wherein said visiting network is for a first-media and said another network is for a different-media, wherein either said first-media is cellular and said different-media is wireless local area network (LAN) or said first-media is wireless local area network (LAN) and said different-media is cellular.

2. The method of claim 1, further including once said mobile node and said authentication agree to perform said pre-authentication using said flag in said message header, said flag is also included in subsequent pre-authentication messages between them.

3. The method of claim 2, further employing protocol for carrying authentication for network access (PANA) as said network access authentication protocol.

4. The method of claim 3, further including having said flag include a P-flag in the PANA header.

5. The method of claim 3, further including having said mobile node transmit a PANA-PAA-Discover message with a P-flag set to initiate pre-authentication.

6. The method of claim 3, further including having said mobile node operate as a PANA client (PaC) and said authentication agent operate as a PANA authentication agent (PAA).

7. The method of claim 1, further including performing said pre-authentication across multiple administrative domains.

8. The method of claim 1, further including performing said pre-authentication in the framework of media-independent pre-authentication.

9. The method of claim 1, further including having said authentication agent respond with an error message if it does not support the pre-authentication.

10. The method of claim 1, further including having pre-authorization and post-authorization for the mobile node involve different authorization policies.

11. A method for proactively establishing a security association between a mobile node in a visiting network and an authentication agent in another network to which the mobile node can move, comprising:

negotiating pre-authentication using a flag in a message header that indicates whether the communication is for establishing a pre-authentication security association;

said mobile node initiating pre-authentication by transmitting a message with the flag set in its message header, and said authentication agent responding with the flag set in its message header only if it supports the pre-authentication;

whereby establishing a pre-authentication security association before said mobile node moves from said visiting network to said another network;

further including performing said pre-authentication using a link-layer agnostic network access authentication protocol between said mobile node and said authentication agent at a server on the another network;

further employing protocol for carrying authentication for network access (PANA) as said network access authentication protocol;

further including having said mobile node operate as a PANA client (PaC) and said authentication agent operate as a PANA authentication agent (PAA);

further including that once the PaC and the PAA have agreed on performing pre-authentication, subsequent PANA messages exchanged between them have the P-flag set.

12. The method of claim 6, further including that when a preparing PAA becomes an active PAA due to movement of the PaC, the PaC performs an IP address update procedure using a PANA-Update exchange in order to update the preparing PAA of the PaC's new address obtained from a remote network where the PAA resides.

13. A method for proactively establishing a security association between a mobile node in a visiting network and an authentication agent in another network to which the mobile node can move, comprising:

negotiating pre-authentication using a flag in a message header that indicates whether the communication is for establishing a pre-authentication security association;

one of said mobile node and said authentication agent initiating pre-authentication by transmitting a message with the flag set in its message header, and the other of said mobile node and said authentication agent responding with the flag set in its message header only if it supports the pre-authentication;

whereby establishing a pre-authentication security association before said mobile node moves from said visiting network to said another network;

further including performing said pre-authentication using a link-layer agnostic network access authentication protocol between said mobile node and said authentication agent at a server on the another network;

further employing protocol for carrying authentication for network access (PANA) as said network access authentication protocol;

further including having said mobile node operate as a PANA client (PaC) and said authentication agent operate as a PANA authentication agent (PAA);

further including that when a preparing PAA becomes an active PAA due to movement of the PaC, the PaC performs an IP address update procedure using a PANA-Update exchange in order to update the preparing PAA of the PaC's new address obtained from a remote network where the PAA resides; and wherein a p-flag is not set in the PANA-Update messages and in subsequent PANA messages.

14. A method for proactively establishing a security association between a mobile node in a visiting network and an authentication agent in another network to which the mobile node can move, comprising:

negotiating pre-authentication using a flag in a message header that indicates whether the communication is for establishing a pre-authentication security association; and one of said mobile node and said authentication agent initiating pre-authentication by transmitting a message with the flag set in its message header, and the other of said mobile node and said authentication agent responding with the flag set in its message header only if it supports the pre-authentication;

whereby establishing a pre-authentication security association before said mobile node moves from said visiting network to said another network;

further including performing said pre-authentication using a link-lager agnostic network access authentication protocol between said mobile node and said authentication agent at a server on the another network;

wherein said visiting network is for a first-media and said another network is for a different-media, wherein either said first-media is cellular and said different-media is wireless local area network (LAN) or said first-media is wireless local area network (LAN) and said different-media is cellular;

further including once said mobile node and said authentication agree to perform said pre-authentication using said flag in said message header, said flag is also included in subsequent pre-authentication messages between them;

further employing protocol for carrying authentication for network access (PANA) as said network access authentication protocol;

further including having said mobile node operate as a PANA client (PaC) and said authentication agent operate as a PANA authentication agent (PAA);

further including that when the PaC has an active Security Association (SA) with an active PAA and a pre-authentication SA with a preparing PAA changes its active PAA without changing a preparing PAA, the PaC performs an IP address update procedure using PANA-Update exchange in order to update the preparing PAA of the PaC's new address obtained from the remote network where the new active PAA resides.

15. The method of claim 14, further including that the completion of the PANA-Update procedure will not change the pre-authentication SA to the active SA.

16. The method of claim 15, further including that a p-flag is set in the PANA-Update messages and in the subsequent PANA messages.

17. A mobile node configured to proactively establish a security association from a visiting network with an authentication agent in another network to which the mobile node can move, comprising:

said mobile node being configured to negotiate pre-authentication using a flag in a message header that indicates whether the communication is for establishing a pre-authentication security association; and said mobile node being configured to initiate pre-authentication by transmitting a message with the flag set in its message header, and to receive a response from said authentication agent with the flag set in its message header only if it supports the pre-authentication;

whereby a pre-authentication security association is established before said mobile node moves from said visiting network to said another network;

said mobile node being configured such that said pre-authentication is performed using a link-layer agnostic network access authentication protocol between said mobile node and said authentication agent at a server on the another network; and wherein said visiting network is for a first-media and said another network is for a different-media, wherein either said first-media is cellular and said different-media is wireless local area network (LAN) or said first-media is wireless local area network (LAN) and said different-media is cellular.

18. An authentication agent configured to proactively establish a security association with a mobile node from a visiting network while the authentication agent is in another network to which the mobile node can move, comprising:

said authentication agent node being configured to negotiate pre-authentication using a flag in a message header that indicates whether the communication is for establishing a pre-authentication security association; and said authentication agent being configured such that when said mobile initiates pre-authentication by transmitting a message with the flag set in its message header that is received by said authentication agent, and said authentication agent responds with the flag set in its message header only if it supports the pre-authentication;

whereby a pre-authentication security association is established before said mobile node moves from said visiting network to said another network;

said mobile authentication agent being configured such that said pre-authentication is performed using a link-layer agnostic network access authentication protocol between said mobile node and said authentication agent at a server on the another network; and wherein said visiting network is for a first-media and said another network is for a different-media, wherein either said first-media is cellular and said different-media is wireless local area network (LAN) or said first-media is wireless local area network (LAN) and said different-media is cellular.

\* \* \* \* \*

UNITED STATES PATENT AND TRADEMARK OFFICE
CERTIFICATE OF CORRECTION

| | | |
|---|---|---|
| PATENT NO. | : 8,565,185 B2 | Page 1 of 2 |
| APPLICATION NO. | : 11/308175 | |
| DATED | : October 22, 2013 | |
| INVENTOR(S) | : Oba | |

It is certified that error appears in the above-identified patent and that said Letters Patent is hereby corrected as shown below:

On the Title Page

On Page 2, in item (56), under "OTHER PUBLICATIONS", in Column 1, Line 5, delete "Socieety," and insert -- Society, --, therefor.

In the Drawings

In Fig. 1, Sheet 1 of 3, delete "post-authoriz,ation" and insert -- post-authorization --, therefor.

In the Specification

In Column 4, Line 46, delete "user stations 23, 25." and insert -- user stations 23, 24. --, therefor.

In Column 5, Line 7, delete "2004." and insert -- 2004, --, therefor.

In Column 8, Line 13, delete "to the the" and insert -- to the --, therefor.

In Column 9, Line 44, delete "independent" and insert -- Independent --, therefor.

In Column 11, Line 21, delete "invention;" and insert -- invention. --, therefor.

In Column 12, Line 61, delete "p-flag" and insert -- P-flag --, therefor.

In Column 13, Line 6, delete "p-flag" and insert -- P-flag --, therefor.

In Column 15, Line 22, delete "R-PAA." and insert -- r-PAA. --, therefor.

Signed and Sealed this
Seventh Day of April, 2015

Michelle K. Lee
*Director of the United States Patent and Trademark Office*

CERTIFICATE OF CORRECTION (continued)
U.S. Pat. No. 8,565,185 B2

In Column 18, Line 49, in Claim 13, delete "p-flag" and insert -- P-flag --, therefor.

In Column 19, Line 2, in Claim 14, delete "link-lager" and insert -- link-layer --, therefor.

In Column 19, Line 16, in Claim 14, delete "subsequent pre-authentication messages between them;" and insert the same at Line 15, after "in" as a continuation subpoint.

In Column 19, Line 34, in Claim 16, delete "p-flag" and insert -- P-flag --, therefor.

In Column 19, Lines 43-45, in Claim 17, delete "message header that indicates whether the communication is for establishing a pre-authentication security association; and" and insert the same at Line 42, after "in a" as a continuation subpoint.

In Column 20, Lines 5-6, in Claim 17, delete "node moves from said visiting network to said another network;" and insert the same at Line 4, after "mobile" as a continuation subpoint.

In Column 20, Lines 30-31, in Claim 18, delete "set in its message header only if it supports the pre-authentication;" and insert the same at Line 29, after "flag" as a continuation subpoint.

In Column 20, Lines 34-35, in Claim 18, delete "node moves from said visiting network to said another network;" and insert the same at Line 33, after "mobile" as a continuation subpoint.